Aug. 11, 1931.   N. E. OGLESBY ET AL   1,818,155
IMPREGNATION OF FILTERS
Filed Oct. 28, 1926

INVENTOR.
Nicholas E. Oglesby
and
BY   Robert S. Brown

ATTORNEY.

Patented Aug. 11, 1931

1,818,155

UNITED STATES PATENT OFFICE

NICHOLAS E. OGLESBY AND ROBERT S. BROWN, OF EDGEWOOD, MARYLAND, ASSIGNORS TO HARRY A. KUHN, OF EDGEWOOD ARSENAL, MARYLAND

IMPREGNATION OF FILTERS

Application filed October 28, 1926. Serial No. 144,813.

(GRANTED UNDER THE ACT OF MARCH 3, 1883, AS AMENDED APRIL 30, 1928; 370 O. G. 757)

The invention described herein may be manufactured and used by or for the Government for Government purposes, without the payment to me of any royalty thereon.

This invention relates in general to filters and more particularly, though not exclusively, to a smoke filter.

It is well known that minute liquid or solid particles suspended in the air commonly termed smokes are not readily removed by bubbling the air containing these particles through various solutions, nor are such particles eliminated after passing through activated charcoal, soda-lime or a number of other substances commonly used as filtering agents for the removal of gases and vapors. Toxic smokes as used in modern warfare are particularly difficult to remove from the air, even when in low concentrations.

Heretofore attempts have been made to remove toxic smokes during the war as well as to remove injurious particles from the air in industrial plants. These filters have generally been composed of porous paper, felt mats or like foraminous mats composed of other forms of cellulose such as cotton linters. The main objection to filters of this character has been the inability to completely remove the fine particles from the air without greatly increasing the resistance of the filters to the flow of the air through its pores.

An object of this invention is to provide a process for increasing the efficiency of filtering materials.

Another object of this invention is to provide a process for increasing the efficiency of filter material with only a small increase in resistance.

Yet another object of this invention is to provide a process for impregnating filter material with uncoagulated smoke particles.

A further object of this invention is to provide a process and apparatus for increasing the efficiency of filter material by impregnation with newly generated finely divided particles.

With these and other objects in view which may be incident to our improvements, the invention consists in the processes and combinations to be hereinafter set forth and claimed, with the understanding that the several necessary elements comprising our invention, may be varied in construction, proportions and arrangement, and the several steps of the process varied, without departing from the spirit and scope of the appended claims.

In order to make our invention more clearly understood, we have shown in the accompanying drawings means for carrying the same into practical effect without limiting the improvements in their useful applications to the particular constructions, which for the purpose of explanation, have been made the subject of illustration.

In the drawings forming a part of this specification wherein is shown an apparatus for carrying the process into effect by the generation of fine particles and the immediate impregnation of foraminous material to make an improved filter.

Figure 4:
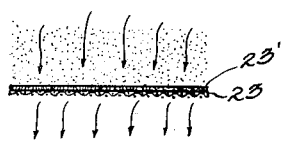
Fig. 4 is a detail view showing the manner of supporting and impregnating the filter material.
Figure 3:
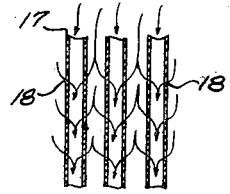
Fig. 3 is a detail view of the air intake pipes.
Figure 2:
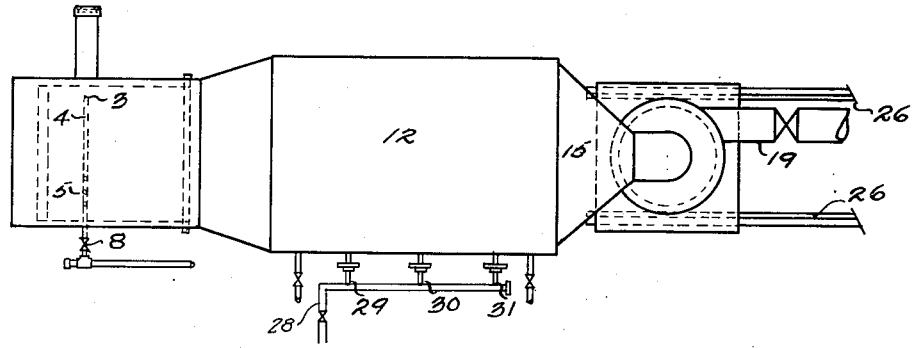
Fig. 2 is a plan view of the apparatus.
Figure 1:
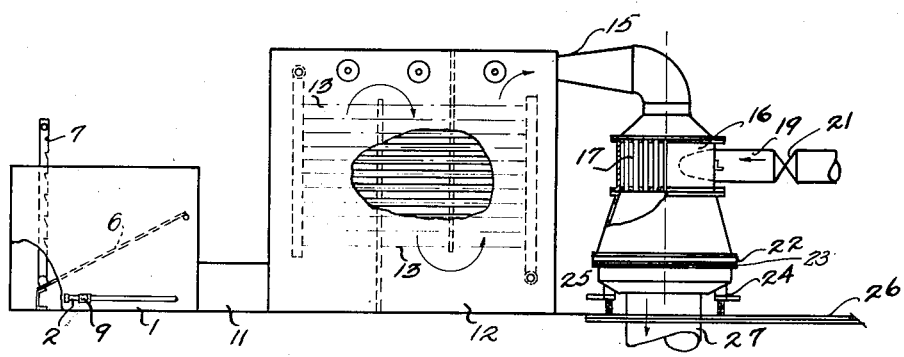
Figure 1 is a side elevational view of the apparatus.

It has been observed that the efficiency of filters may be increased by impregnating with solid materials in a relatively fine state of subdivision. Thus in the past filters have been impregnated with ground charcoal and lamp black.

We have found that a filter of very high efficiency and a low resistance can be obtained if the solid impregnating material be deposited on the foraminous material in a very fine state of subdivision.

The particles of charcoal even when finely ground are much coarser than those found in a permanent smoke cloud. Similarly particles of lamp black and gas black, which are coagulated smokes, are much coarser than those formed at the time of generation. Our experiments have proved that a filter possessing in a high degree the desirable qualities of high efficiency and low resistance can be obtained by impregnating a foraminous material with freshly generated non-coagulated smokes.

Extremely fine particles can be generated in a number of ways. Thus diphenylaminechlorarsine, a solid toxic smoke material, may be evaporated, diluted and condensed. Upon condensation a finely divided smoke cloud results. The size of the particles depends on the dilution and rate of cooling of the vapors.

Another method of forming finely divided particles is by causing two gases to interact, for instance ammonia and hydrogen chloride. In such a method the gases are first diluted and then allowed to react in the presence of moisture in the diluting air to form ammonium chloride smoke.

As another example may be considered the production of finely divided zinc oxide. Metallic zinc may be vaporized, mixed with air and oxidized to zinc oxide. In this case dilution is insured to some extent by the nitrogen of the air. Finer particles of the oxide may be obtained, however, if the zinc vapors are first diluted with an inert gas, such as carbon dioxide or nitrogen.

While the foregoing examples illustrate the general principles that finely divided particles may be produced by certain materials by reacting in and condensing from the vapor phase with adequate predilution, not all of these are suitable for our purposes. Thus, while ammonium chloride may be used as a filter impregnating material, it tends to take up water from moist air and is not so satisfactory as certain other materials. Similarly while diphenylaminechlorarsine may be obtained in a fine state of subdivision, its toxicity and high cost are objectionable. Again while zinc oxide smoke is effective in improving some filters, it is not suitable for use in filters through which mineral acids, or materials that yield mineral acids pass. For instance, phosgene gas decomposes in the presence of moisture to give hydrochloric acid which reacts with zinc oxide to form the hydroscopic salt zinc oxide and hence this impregnating material is undesirable in gas masks used in modern warfare.

It will appear then that in general inert, insoluble solid particles are preferred for impregnating the filter. Finely divided carbon is almost ideal for the purpose, for not only does it meet the requirements given but also the amorphous carbon presents the added advantage of low apparent specific gravity and a high covering power per unit of weight.

We propose therefore to use very finely divided carbon particles. While the carbon black and lamp black have been made before, the ordinary processes will not serve our purposes. In all the old processes the particles are coagulated and recovered as a powder as they are formed. Since, as has been intimated, the uncoagulated particles are much more efficacious for impregnating filters than the aggregated or coagulated particles. We have devised a process and apparatus by which the carbon particles are formed and deposited on a filter material in uncoagulated form.

Finely divided particles of carbon may be obtained by cracking such gases as methane, ethane, ethylene and acetylene. Gases are particularly well adapted for the production of fine carbon particles by our process; however, readily vaporized liquid, such as gasoline or kerosene, give good results, provided the cracking is preceded by vaporization, that is to say, when the cracking takes place in the vapor phase. In this method of producing fine particles dilution may be artificially produced by the use of an inert gas, but generally such dilution is obtained by burning a large part of the material being cracked, the original vapors and resulting gases providing the dilution required.

In the drawings we have shown an apparatus in which our method of forming finely divided particles and depositing them on a filter in uncoagulated form may be carried out.

Referring by numerals to the drawings wherein the same numerals denote the same elements throughout, the apparatus consists in general of a smoke generating compartment 1 provided with a gas burner 2. The gas burner 2 comprises a pipe 3 provided with orifices 4 adapted to receive suitable burner tips 5 which extend across the compartment 1, turned in a parallel plane with the pipe 3. A damper 6 is provided with an adjustable lever 7 so that the damper may be raised to the top of the compartment allowing a large opening. The damper 6 is left in this position until the burner tips are fully ignited, preventing an explosion, in the event the compartment contains an explosive mixture of gas and air.

When the burners have all been ignited, the supply of air may be reduced to any desirable degree by lowering the damper 6 through the medium of the lever 7. A flow of gas is adapted to be regulated by a valve 8 on the gas burner. A sight glass 9 is provided on the side of the compartment 1 to permit observation of the burning.

The compartment 1 is designed to be connected by a pipe 11 to a compartment 12. The compartment 12 is adapted to contain a system of pipes 13 to which are connected the water manifolds. It will be noted that the compartment is divided by baffles to cause a circuitous passage of the gas and thereby insure proper cooling.

Connected to the compartment 12 by a pipe 15 is a compartment 16 adapted to contain tubes 17 provided with apertures 18. The compartment 16 is further provided with an air intake 19 having a regulator 21. The compartment 16 is provided with a wire screen or perforated support plate 23 adapted to hold the material to be treated. This material is adapted to be laid on the support 22 operated by jacks 24 through a lever 25 so that the support is lowered away from the rest of the apparatus and removed by withdrawing it along the rails 26. Thus the filter is placed on the support and the support is run along the rails to a point immediately under the top of the apparatus and is raised by using the jacks 24 so as to clamp the support in place.

A fluid line 27 is secured to the support 22 adapted to be connected to an exhauster which may be of any type, which will give the required pressure differential between the atmosphere and the apparatus to insure a ready flow of the gas through the filter material.

The operation of this device may be readily understood. When the burners 5 have all been lighted the supply of air on the compartment 1 is reduced to any desired amount by lowering the damper 6 by the operation of the lever 7. The flow of gas is regulated by the valve 8 on the gas burner 2. The manner of burning is observed through the sight glass 9.

The combustion gas and newly generated suspended particles are passed in a serpentine path around the cooling pipes 13 located in the compartment 12. The temperature of the gas and particles is reduced so as not to injure the filter material to be treated. From the compartment 12 the particles suspended in the gas pass through the pipe 15 into the compartments 16 and thence through the tubes 17. If desired at this stage the gas may be further diluted and cooled with air introduced into the tubes 17 through apertures 18; the amount being regulated by the regulator 21.

A large volume of air can be added in the compartment 16, or any smaller quantity of air desired may be added by suitable adjustment of the regulator. The provision for cooling with a variable quantity of air can be used with advantage to compensate for the variations which may occur in the compartment 1 as the tubes 11 become coated with soot. The gas and entrained particles therefore may be delivered to the filter at a temperature below that which would cause injury to the foraminous material.

As the gases are drawn through the material the impregnation is accomplished by the deposition of the entrained particles on the filter. The gases having passed through the material are then carried away through the pipe 27 to an exhauster or blower. This, as has been explained, may be of any desired type that will give the required pressure differential between the atmosphere and the apparatus to insure a ready flow of the gas through the foraminous material. After this treatment the material, designated by numeral 23, may be removed by operating the jacks 24 through the medium of the lever 25 so that the support 23 is lowered away from the rest of the apparatus and removed from under by running it along the rail 26. The impregnated material may then be removed and cut to the desired sizes.

After extended operation the pipes become coated with a deposit of soot which lowers the efficiency of the cooling apparatus. We have provided a steam line 28 having connected thereto the branch lines 29, 30 and 31 leading into the top of the chamber and positioned above the water pipes 13. When it is desired to clean the pipes 13, steam is admitted to the steam line 28 and is blown through the apertured pipes 29, 30 and 31. This current of steam effectively cleans the pipes and the resulting heavy soot settles to the bottom of the chamber. This soot may then be removed through man holes or doors placed near the bottom of the chamber in any convenient manner.

The gases carrying smoke are passed through the filter material for a predetermined time depending upon the particular apparatus used, the particular filtering medium employed and the quality of the filter sought. At the end of treatment the support 22 is withdrawn as previously described and the impregnated material removed, where it may be prepared for use in any desired type of purifying apparatus.

The above illustration is only one means of carrying out the underlying principles of this invention. The fine solid particles may be generated by other means and used directly without prior coagulation to impregnate the material. The filter further may first be formed and assembled as a part of the apparatus for which it is intended for use and then impregnated; the procedure may thus be varied to accommodate different conditions.

It will be seen therefore that we have devised a process for impregnation of filters which insures a very high efficiency and low resistance. We conceive our invention to reside broadly in impregnation with very fine uncoagulated solid particles, for while for purposes of illustration we have particularly described impregnation by carbon, it is to be understood that we do not intend to be limited to the use of this material. Also it is to be understood that while we have shown a preferred mechanism for effectually carrying out our process, this is for purposes of exemplification merely, hence we do not propose to be restricted to the use of any materials or apparatus except within such limits as are defined in the appended claims.

We claim:

1. A process for increasing the efficiency of porous filtering material comprising impregnating the material with solid carbonaceous particles in colloidal suspension.

2. A process for increasing the filtering efficiency of porous material comprising diluting and cooling vaporized solids with gases and impregnating the material with the mixture.

3. A process for increasing the filtering efficiency of porous material comprising cracking hydrocarbons in the vapor phase, cooling the products and impregnating the material with said products.

4. A process for producing improved filters comprising the step of cracking a hydrocarbon in a vapor phase and subsequently depositing the resulting carbon on a filter material.

5. A process for producing an improved filter comprising generating a gaseous suspension of solid particles, cooling the gaseous suspension and impregnating a porous material with said particles by passing the gaseous suspension therethrough.

6. A process for producing an improved filter comprising passing a solid smoke through a foraminous filtering material.

7. A process for producing a filtering material comprising diluting and condensing a vaporized solid in a gaseous medium and subsequently passing the gas through a foraminous filtering material.

8. A process for producing a filtering material comprising cracking a hydrocarbon and impregnating the foraminous filtering material with the carbon formed during the cracking stage.

9. A process for improving filters comprising the step of generating a colloidal suspension of solid carbonaceous particles and subsequently without coagulating and collecting said particles impregnating porous material with them by passing said suspension through the material.

10. A process for producing a filtering material comprising cracking in the vapor phase a material containing combined carbon and impregnating a foraminous filtering material with the carbon formed during the cracking stage.

11. In a process for producing an improved filter, the steps of generating a colloidal suspension of carbonaceous solid particles, cooling said suspension, diluting said suspension and impregnating a porous material with the solid particles carried in the suspension by passing the suspension through the material.

12. In a process for producing an improved filter, the steps of generating a colloidal suspension of carbonaceous solid particles, controlling the temperature and the concentration of said suspension, and impregnating a porous material with said particles in uncoagulated form by passing the suspension through said material.

13. In a process for producing an improved filter, the steps of generating a colloidal suspension of solid particles from a hydrocarbon, controlling the temperature and the concentration of the suspension, and impregnating a porous material with said solid particles in uncoagulated form by passing said suspension through said material.

14. A process for producing an improved filter, the steps of generating a colloidal suspension of carbonaceous solid particles, controlling the temperature and concentration of the suspension and impregnating a porous material with the solid particles by drawing the suspension through the material.

In testimony whereof we affix our signatures.

NICHOLAS E. OGLESBY.
ROBERT S. BROWN.